(No Model.)

A. C. BROWN.
COMBINED HARROW AND CULTIVATOR.

No. 419,820. Patented Jan. 21, 1890.

WITNESSES:
John W. Deemer
C. Sedgwick

INVENTOR:
A. C. Brown
BY
Munn & Co.
ATTORNEYS.

UNITED STATES PATENT OFFICE.

ASA C. BROWN, OF EUGENE CITY, OREGON.

COMBINED HARROW AND CULTIVATOR.

SPECIFICATION forming part of Letters Patent No. 419,820, dated January 21, 1890.

Application filed July 23, 1889. Serial No. 318,360. (No model.)

*To all whom it may concern:*

Be it known that I, ASA C. BROWN, of Eugene City, in the county of Lane and State of Oregon, have invented a new and Improved Combined Harrow and Cultivator, of which the following is a full, clear, and exact description.

This invention relates to a combination agricultural implement; and it consists, essentially, of a main frame provided with handles and with a draft-bail, a shovel-carrying auxiliary frame adjustably connected to the main frame, cutters or guiding-rods extending downward and to the rear from the rear end of the frame, and a rotary harrow arranged for connection with the central portion of the frame, all as will be hereinafter fully described, and specifically pointed out in the claim.

Reference is to be had to the accompanying drawings, forming a part of this specification, in which similar figures and letters of reference indicate corresponding parts in all the views.

Figure 1:
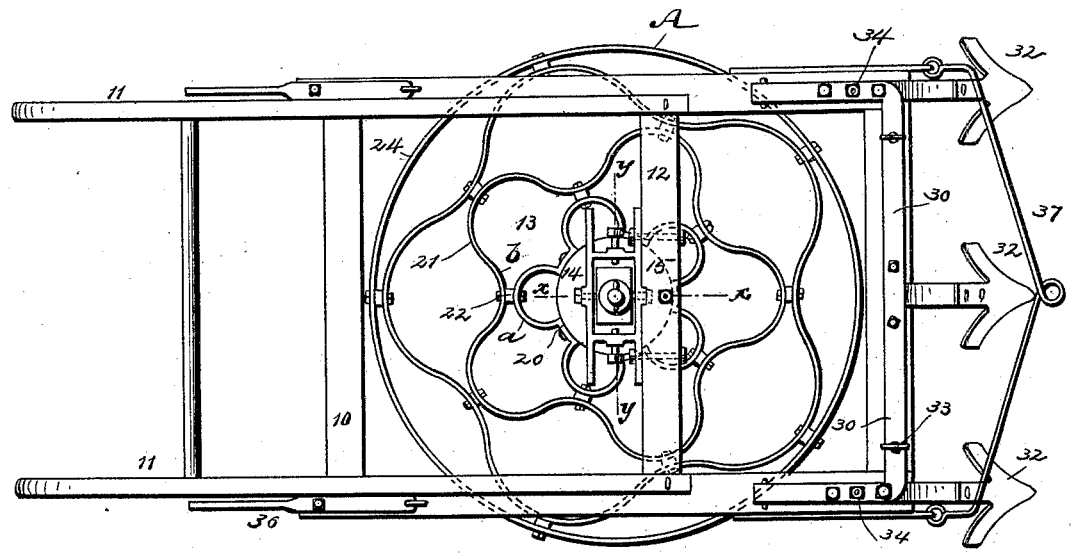
Figure 4:
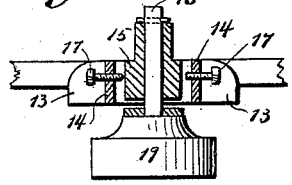
Figure 2:
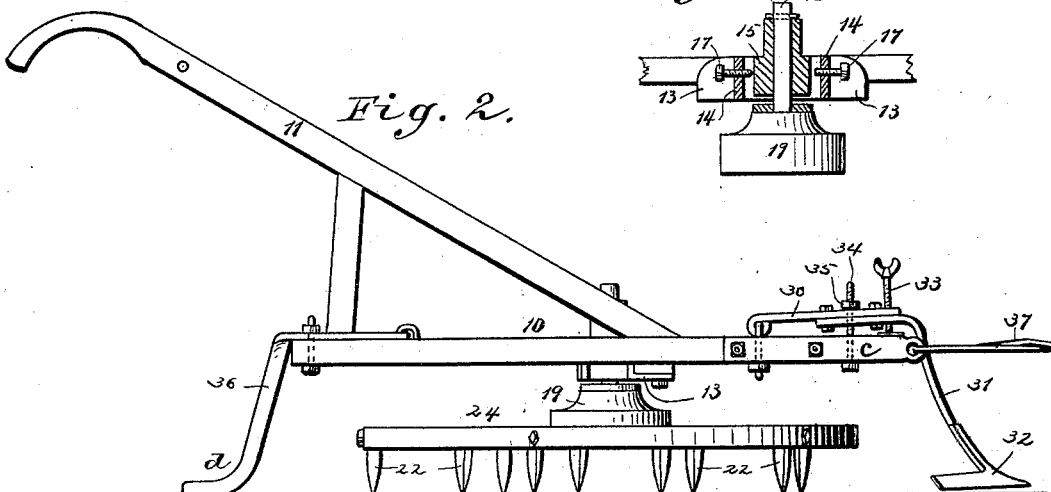
Figure 3:
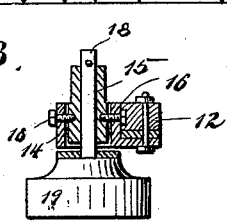

Figure 1 is a plan view of my improved agricultural implement. Fig. 2 is a side view thereof. Fig. 3 is a view on line $x\ x$ of Fig. 1, and Fig. 4 is a view on line $y\ y$ of Fig. 1.

In the drawings, 10 represents the main frame, which is preferably rectangular and provided with handles 11, that are connected and braced in any proper manner. The frame 10 carries a central cross-bar 12, to which there is bolted a casting 13, which forms a box 14, and within the box 14 is pivotally mounted a block 15, the block 15 being supported by pivot pins or bolts 16, and the range of motion of the block being regulated by stop-bolts 17.

The block 15 is centrally apertured to receive a gudgeon 18, which extends upward from the hub 19 of a trussed harrow-wheel A, which said wheel is substantially similar in construction to the wheel illustrated, described, and claimed in Letters Patent No. 398,937, granted to me on the 5th day of March, A. D. 1889. In other words, to the central hub there is connected a strip 20, formed with outwardly-extending sections $a$, to which sections $a$ there is connected a strip 21, having inwardly-extending sections $b$, harrow-teeth 22 being bolted to place between the sections $a$ and $b$, this construction being followed out until the outer rim 24 is reached, as many strips similar to the one shown at 21 being employed as may be deemed desirable. By mounting the harrow-wheel in this way I provide for the proper operation of the wheel irrespective of the contour of the ground.

To the forward end of the frame 10, I hinge or pivotally connect an auxiliary frame 30, to which there are bolted the standards 31 of cultivator-shovels 32, and in order that the frame 30 may be adjusted and held in position, so that the cultivator-shovels will operate properly upon the soil, I provide adjusting-screws 33, which pass through threaded apertures formed in the frame 30 and bear against a wear-plate $c$, that is carried by the frame 10, all upward movement of the frame 30 being prevented by bolts 34, which pass through the frames 10 and 30 and engage nuts 35, which bear against the upper face of the frame 30.

To the rear of the frame 10, I connect downwardly-extending cutter-arms 36, the lower ends of said arms being curved to the rear, as shown at $d$, such arms acting as guiding-arms or rudders when the implement is being drawn forward, thus preventing any lateral or side movement of the implement.

The draft-animal is connected to a bail 37, that is secured to the frame 10, the draft thus being transferred directly to said frame, whereby the frame 30 is left free. The advantages of this construction will be readily appreciated.

Having thus described my invention, I claim as new and desire to secure by Letters Patent—

A combined harrow and cultivator comprising the rectangular main frame 10, the rotary harrow, the U-shaped bar or frame 30, hinged at its rearwardly-extending sides or ends to the upper sides of the side bars of the frame 10 in front of the harrow, the adjusting-bolts 33, extending through the opposite sides or ends of the frame or bar 30 and bearing on the side bars, and the bolts 34, extending through the sides of the two frames 10 30 and provided with nuts 35, the standards 31, extending downwardly from the frame 30 in front of frame 10, and the cutter-arms 36 at the rear ends of the side bars of the frame 10, substantially as set forth.

ASA C. BROWN.

Witnesses:
  A. G. HOVEY,
  W. R. WALKER.